(12) United States Patent
Yamamoto et al.

(10) Patent No.: US 9,889,717 B2
(45) Date of Patent: Feb. 13, 2018

(54) DAMPING FORCE CONTROL APPARATUS OF SUSPENSION

(71) Applicant: Aisin Seiki Kabushiki Kaisha, Kariya-shi (JP)

(72) Inventors: Akihito Yamamoto, Nagoya (JP); Wataru Tanaka, Toyota (JP); Takafumi Makino, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 81 days.

(21) Appl. No.: 14/974,133

(22) Filed: Dec. 18, 2015

(65) Prior Publication Data
US 2016/0176259 A1    Jun. 23, 2016

(30) Foreign Application Priority Data
Dec. 18, 2014    (JP) .................................. 2014-256538

(51) Int. Cl.
*B60G 17/018*    (2006.01)
*B60G 17/016*    (2006.01)
(Continued)

(52) U.S. Cl.
CPC ....... *B60G 17/0182* (2013.01); *B60G 17/016* (2013.01); *B60G 17/018* (2013.01); *B60G 17/01933* (2013.01); *B60G 17/06* (2013.01); *B60G 2400/202* (2013.01); *B60G 2400/204* (2013.01); *B60G 2500/10* (2013.01)

(58) Field of Classification Search
CPC .......... B60G 17/0182; B60G 17/01933; B60G 17/016; B60G 17/018
See application file for complete search history.

(56) References Cited

U.S. PATENT DOCUMENTS 4,881,172 A * 11/1989 Miller ................ B60G 17/0182
701/37
4,989,148 A * 1/1991 Gurke .................. B60G 17/018
701/37
(Continued)

FOREIGN PATENT DOCUMENTS

JP       10-913       1/1998
JP       2010-58541   3/2010

*Primary Examiner* — Dale W Hilgendorf
(74) *Attorney, Agent, or Firm* — Oblon, McClelland, Maier & Neustadt, L.L.P.

(57) ABSTRACT

A damping force control apparatus controlling a damping force control value for a damper whose damping force is set by the damping force control value includes: a relative velocity estimation device estimating a relative velocity of a vehicle wheel with respect to a vehicle body; and a damping force calculation device determining the damping force control value to control vibration of the vehicle body based on control input variables of the vehicle body and an estimated relative velocity, wherein the relative velocity estimation device includes an estimated damping force calculation section, a delay correction section, and a relative velocity calculation section, and the delay correction section corrects the estimated damping force and varies delay correction terms to reduce divergence between an actual measured relative velocity and the estimated relative velocity in different damping coefficients of the damper.

8 Claims, 3 Drawing Sheets

(51) Int. Cl.
*B60G 17/019* (2006.01)
*B60G 17/06* (2006.01)

(56) References Cited

U.S. PATENT DOCUMENTS

| | | | | |
|---|---|---|---|---|
| 5,071,159 | A * | 12/1991 | Kamimura | B60G 17/018 |
| | | | | 280/5.507 |
| 5,721,681 | A * | 2/1998 | Borschert | B60G 17/018 |
| | | | | 701/37 |
| 5,810,384 | A * | 9/1998 | Iwasaki | B60G 17/018 |
| | | | | 701/37 |
| 5,987,367 | A * | 11/1999 | Ohsaku | B60G 17/018 |
| | | | | 701/37 |
| 8,116,938 | B2 | 2/2012 | Itagaki et al. | |
| 2005/0178628 | A1 * | 8/2005 | Uchino | B60G 17/018 |
| | | | | 188/379 |

* cited by examiner

DAMPING FORCE CONTROL APPARATUS OF SUSPENSION

CROSS REFERENCE TO RELATED APPLICATIONS

This application is based on and claims priority under 35 U.S.C. § 119 to Japanese Patent Application 2014-256538, filed on Dec. 18, 2014, the entire contents of which are incorporated herein by reference.

TECHNICAL FIELD

This disclosure relates to a damping force control apparatus of a suspension.

BACKGROUND DISCUSSION

As a damping force control apparatus of a suspension, for example, a technique described in JP10-913A (Reference 1) has been known.

The damping force control apparatus according to the technique includes an opening determination unit that determines an orifice opening degree of a damper for controlling a damping force. The opening determination unit determines the orifice opening degree based on a vehicle velocity and a relative velocity of a vehicle wheel with respect to a vehicle body. Here, each of the vehicle velocity and the relative velocity is calculated based on an output (acceleration) that is obtained by an acceleration sensor of the vehicle body.

The relative velocity is estimated by applying a Kalman filter theory to a modeled damper. Upon application of the Kalman filter theory, the damping force of the damper is divided into a linear component and a nonlinear component.

In addition, in JP2010-58541A (Reference 2), an output deviation, corresponding to the difference between a sprung velocity (observed output) of the vehicle and an estimated sprung velocity (estimated observed output) from an approximate vehicle model of an observer for the actual vehicle model state amount estimation, is obtained. Then, a first observer gain of an observer for the actual damping force estimation calculates a dynamic characteristic compensation signal and a second observer gain of the observer for the actual vehicle model state amount estimation calculates a vehicle model compensation signal from the output deviation. The dynamic characteristic compensation signal is input into a dynamic characteristic giving unit of the observer for the actual vehicle model state amount estimation and is used for adjusting setting contents of the dynamic characteristic giving unit. Thus, the occurrence of time delay of the control is suppressed.

However, in the estimation of the relative velocity of the above-described related art, the estimated relative velocity is greatly diverged from the actual measured relative velocity. For example, if the observer of the relative velocity is designed to improve estimation accuracy in a case of full soft (state where a damping coefficient is the smallest), estimation accuracy in a case of full hard (state where the damping coefficient is the largest) is reduced. In contrast, if the observer of the relative velocity is designed to improve the estimation accuracy in a case of full hard, the estimation accuracy in full soft is reduced. As a result, the damping force of the damper may not be set to be an appropriate value on a full hard side (or on a full soft side). As described above, there is room for improvement in the damping force control apparatus of the suspension of the related art.

SUMMARY

Thus, a need exists for a damping force control apparatus of a suspension which is not susceptible to the drawback mentioned above.

A damping force control apparatus according to an aspect of this disclosure controls a damping force control value for a damper in which a damping force is set by the damping force control value, and includes: a relative velocity estimation device that estimates a relative velocity of a vehicle wheel with respect to a vehicle body; and a damping force calculation device that determines the damping force control value so as to control vibration of the vehicle body based on control input variables of the vehicle body and an estimated relative velocity that is estimated by the relative velocity estimation device. The relative velocity estimation device includes an estimated damping force calculation section that estimates the damping force of the damper based on the estimated relative velocity and the damping force control value, a delay correction section that obtains an estimated damping force after delay correction by correcting the estimated damping force that is estimated by the estimated damping force calculation section, and a relative velocity calculation section that calculates the estimated relative velocity based on the estimated damping force after the delay correction and input variables of the relative velocity estimation device. The delay correction section corrects the estimated damping force based on the damping force control value during calculation and varies delay correction terms so as to reduce divergence between the actual measured relative velocity and the estimated relative velocity in a plurality of different damping coefficients of the damper.

A suspension according to still another aspect of this disclosure includes the damping force control apparatus. According to this configuration, damping characteristics of the suspension are improved by the improvement of estimation accuracy of the relative velocity.

BRIEF DESCRIPTION OF THE DRAWINGS

The foregoing and additional features and characteristics of this disclosure will become more apparent from the following detailed description considered with the reference to the accompanying drawings, wherein:

FIG. 4A is a graph illustrating a linear component, and FIG. 4B is a graph illustrating a nonlinear component;

FIG. 6A is a graph illustrating an estimated value and a measured value of a relative velocity in a damper that is in a soft state, and FIG. 6B is a graph illustrating the estimated value and the measured value of the relative velocity in the damper that is in a hard state;

FIG. 7A is a graph illustrating an estimated value and a measured value of a relative velocity in a damper that is in a soft state, and FIG. 7B is a graph illustrating the estimated value and the measured value of the relative velocity in the damper that is in a hard state; FIG. 8A is a graph illustrating an estimated value and a measured value of a relative velocity in a damper that is in a soft state, and FIG. 8B is a graph illustrating the estimated value and the measured value of the relative velocity in the damper that is in a hard state.

DETAILED DESCRIPTION

A damping force control apparatus of a suspension will be described with reference to FIGS. 1 to 8.

The damping force control apparatus (hereinafter, referred to as a damping force control apparatus 1) of the suspension controls a damping force of a semi-active damper that is a configuration element of the suspension of a vehicle. The semi-active damper variably sets the damping force based on a damping force control value P. The damping force indicates a resistance force that prevents movement of a piston. In the following description, the semi-active damper is simply referred to as a "damper 20".

The damping force control apparatus 1 calculates the damping force control value P based on a movement state of a vehicle body 100 and outputs the damping force control value P to the damper 20. The damper 20 sets the damping force based on the damping force control value P. For example, the damper 20 changes an opening degree between a valve body and a valve seat by changing an opening degree of an orifice of the damper 20 provided in the piston based on the damping force control value P. Thus, the damping force of the damper 20 is adjusted by controlling a flow amount of lubricating oil flowing between two oil chambers partitioned by the piston within the damper 20. Moreover, a state where the piston is difficult to move by reducing the opening degree (opening area is reduced) of the damper 20 is referred to as a hard state of the damper 20. A state where the piston is easy to move by increasing the opening degree (opening area is increased) of the damper 20 is referred to as a soft state of the damper 20.

Figure 1:
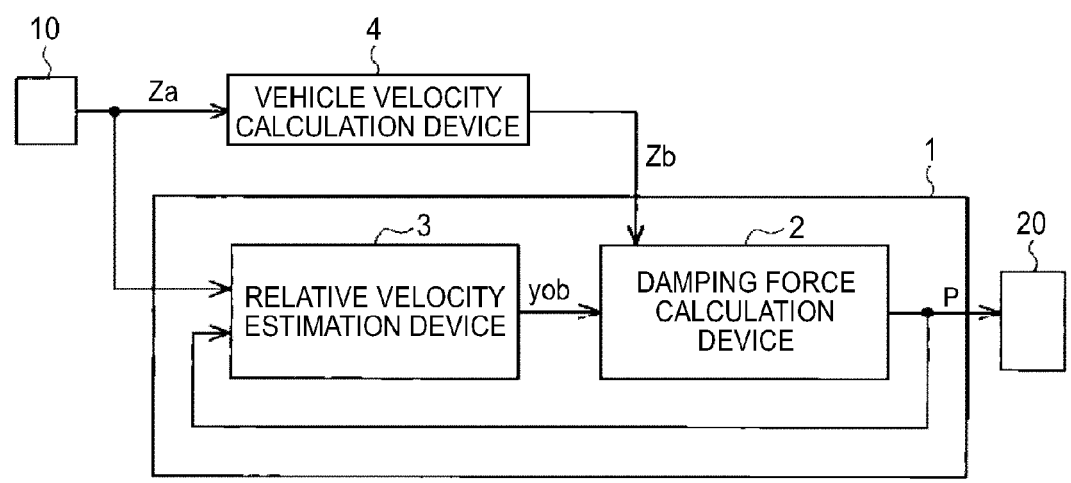
FIG. 1 is a block diagram of a damping force control apparatus of a suspension.

As illustrated in FIG. 1, the damping force control apparatus 1 calculates the damping force control value P that is output to the damper 20 based on an acceleration (hereinafter, referred to as a "vehicle acceleration Za") of the vehicle body 100 (see FIG. 2) in an up-and-down direction (direction along an axis of the damper 20, the same applies to the following) and a velocity (hereinafter, referred to as a "vehicle velocity Zb") of the vehicle body 100 in the up-and-down direction. The damping force control apparatus 1 is embodied by at least one memory and at least one processor that executes instructions stored on the at least one memory.

The vehicle velocity Zb is derived by a vehicle velocity calculation device 4.

The vehicle velocity calculation device 4 derives the vehicle velocity Zb by integrating the vehicle acceleration Za. As the vehicle acceleration Za, a signal which is output from an acceleration sensor 10 that is mounted on the vehicle body 100 and detects the acceleration (the vehicle acceleration Za) of the vehicle body 100 in the up-and-down direction, is used.

The damping force control apparatus 1 includes a damping force calculation device 2 and a relative velocity estimation device 3.

The damping force calculation device 2 calculates the damping force control value P based on control input variables and an estimated relative velocity yob. The control input variables are variables such as the vehicle velocity Zb, the vehicle acceleration Za, and an up-and-down displacement (displacement between the vehicle body and the vehicle wheel) of the vehicle body. For example, as illustrated in FIG. 1, as the control input variables, the vehicle velocity Zb is used. The damping force calculation device 2 is constituted based on a skyhook control theory or an Hoc control theory. Moreover, the estimated relative velocity yob indicates an estimated value of a velocity (hereinafter, referred to as a "relative velocity y") of a vehicle wheel 200 with respect to the vehicle body 100.

The estimated relative velocity yob is derived by the relative velocity estimation device 3.

The relative velocity estimation device 3 derives the estimated relative velocity yob based on input variables of the relative velocity estimation device and the damping force control value P output from the damping force calculation device 2. The input variables of the relative velocity estimation device are variables such as the vehicle velocity Zb, the vehicle acceleration Za, and the up-and-down displacement (displacement between the vehicle body and the vehicle wheel) of vehicle body. For example, as illustrated in FIG. 1, as the input variables of the relative velocity estimation device, the vehicle acceleration Za is used. The relative velocity estimation device 3 is configured based on a Kalman filter theory.

A configuration example of the relative velocity estimation device 3 will be described with reference to FIGS. 2 to 5.

Figure 2:
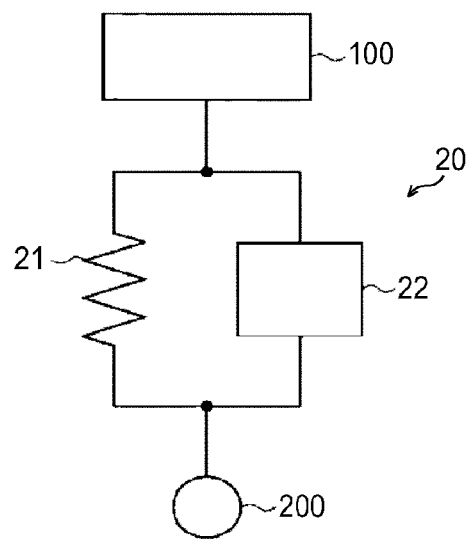
FIG. 2 is a model of a damper.

FIG. 2 is a model of the damper 20 that is premised on the use of the Kalman filter theory. The damper 20 connects the vehicle body 100 and the vehicle wheel 200. That is, the vehicle body 100 is supported by the vehicle wheel 200 and the damper 20.

As illustrated in FIG. 2, the damper 20 is configured of a spring 21 and a vibration damping device 22 (shock absorber).

When a mass of the vehicle body 100 is "M", the vehicle acceleration Za is "Za", a spring coefficient is K, a spring stretch distance is xs, a damping force of the vibration damping device 22 is fd(y, P), the damping force control value P of the damper 20 is "P", and the relative velocity y is "y", a motion equation of the vehicle body 100 is as follows.

$$M \cdot Za = K \cdot xs + fd(y, P) \qquad (1)$$

The "K·xs" indicates an elastic force of the spring 21. The damping force "fd(y, P)" of the vibration damping device 22 is generally nonlinear with respect to the relative velocity y (see FIG. 3). Damping force characteristics indicating a change in the damping force with respect to the relative velocity y are changed in compliance with the damping force control value P. Thus, in the embodiment, the damping force fd(y, P) is divided into a linear component and a nonlinear component.

Figure 3:
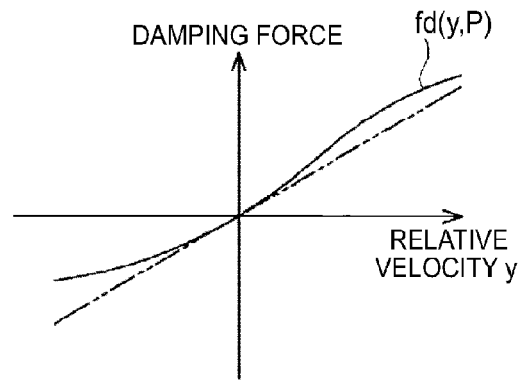
FIG. 3 is a graph of a damping force characteristic illustrating a change in a damping force with respect to a relative velocity.

FIG. 3 is a graph illustrating the damping force fd(y, P) when the damping force control value P is a predetermined value.

As described above, the damping force fd(y, P) is nonlinear with respect to the relative velocity y. A broken line illustrated in FIG. 3 is an expression that is a primary approximate expression or is equivalent to the primary approximate expression of the damping force fd(y, P) when the damping force control value P is the predetermined value. The primary approximate expression or the expression equivalent to the primary approximate expression corresponds to the linear component.

Figure 4A:
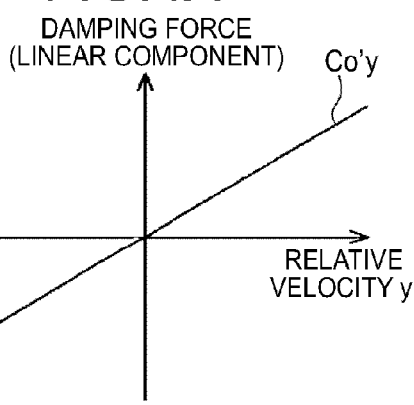
FIGS. 4A and 4B are graphs of the damping force characteristic illustrating the change in the damping force with respect to the relative velocity.

FIG. 4A illustrates the linear component of the damping force fd(y, P) when the damping force control value P is the predetermined value. The graph is the same as the broken line of FIG. 3.

Figure 4B:
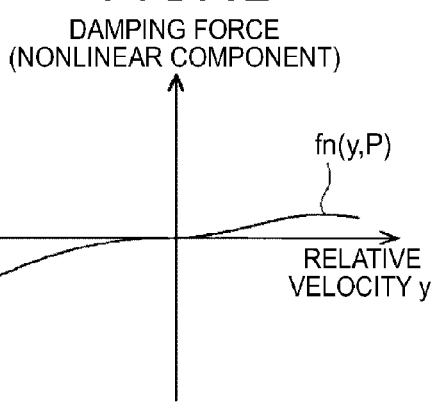

FIG. 4B illustrates the nonlinear component of the damping force fd(y, P) when the damping force control value P is the predetermined value. The graph is obtained by subtracting the linear component from the damping force fd(y, P). That is, the damping force fd(y, P) is a sum of the linear component of the damping force fd(y, P) and the nonlinear component of the damping force fd(y, P).

Here, when a coefficient of the linear component is Co and the nonlinear component is a function of the relative velocity y and the damping force control value P, the damping force fd(y, P) is indicated as follows.

$$fd(y,P) = Co \cdot y + fn(y,P) \quad (2)$$

It is possible to derive a state equation by using Expression (1), Expression (2), a state variable x1 meaning the relative velocity y, and a state variable x2 meaning the spring stretch distance.

$$X' = AX + Gw + Bfn(y,P) \quad (3)$$

Here, a column vector of X=(x1, x2), A, G, and B indicate a matrix having a predetermined value. X' is a derivative of X.

On the other hand, the following output equation is obtained from a relationship between the relative velocity y and the vehicle acceleration Za.

$$Y = (C,U)X + v + (D,F)fn(y,P) \quad (4)$$

Here, Y is a column vector of (y1, y2), y1 is the relative velocity y, and y2 is the vehicle acceleration Za. C, U, D, and F are respectively row vectors having a predetermined value. (C, U) is a column vector in which C and U are elements. (D, F) is a column vector in which D and F are elements. Observation noise is indicated by v.

It is possible to obtain an observer for estimating y1 (relative velocity y) when using the Kalman filter theory based on Expression (3) and Expression (4). The following Expression (5) to Expression (7) are the observer of y1 (relative velocity y).

$$uob = fn(yob,P) \quad (5)$$

$$X' = AXob + Buob + H(Za - (UXob + Duob)) \quad (6)$$

$$y1 = y = CXob \quad (7)$$

The uob and yob respectively indicate estimated values of u and y. That is, the uob indicates the estimated value (estimated nonlinear component) of the nonlinear component and the yob indicates the estimated relative velocity. Za indicates vehicle acceleration. The fn(yob, P) is a function of which the estimated relative velocity yob and the damping force control value P are variables. H indicates a steady-state Kalman gain.

Figure 5:
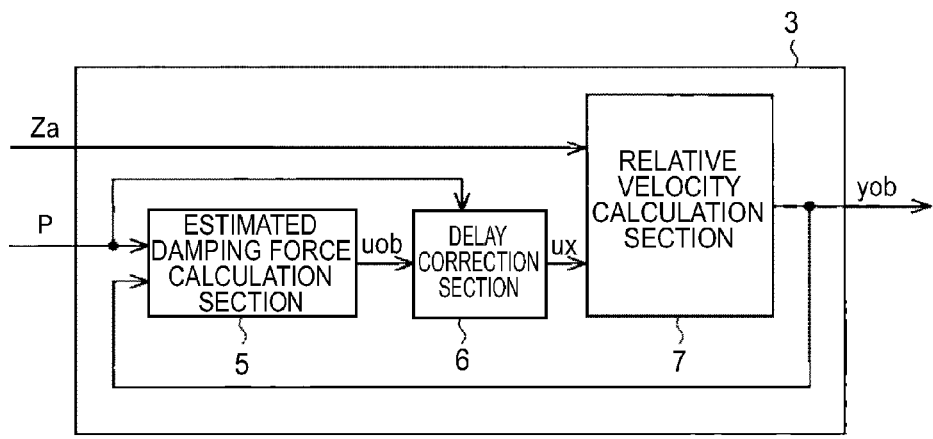
FIG. 5 is a block diagram of a relative velocity estimation device.

FIG. 5 illustrates the relative velocity estimation device 3 including the observer obtained as described above.

The relative velocity estimation device 3 includes an estimated damping force calculation section 5, a delay correction section 6 that corrects the estimated nonlinear component (estimated damping force and estimated damping force information) uob output from the estimated damping force calculation section 5, and a relative velocity calculation section 7 that derives the estimated relative velocity yob based on an estimated damping force after the delay correction (estimated damping force information after the delay correction) ux output from the delay correction section 6.

The estimated damping force calculation section 5 corresponds to fn(yob, P) of the observer. The estimated damping force calculation section 5 has a function (configured of formulas, maps, tables, or programs) for forming the nonlinear component of the damping force and derives the estimated nonlinear component (estimated damping force and estimated damping force information) uob by inputting the estimated relative velocity yob and the damping force control value P into the function. The function for forming the nonlinear component of the damping force is determined in advance as a function of the estimated relative velocity yob for each damping force control value P based on characteristics of the damper 20.

The delay correction section 6 corrects the estimated nonlinear component (estimated damping force and estimated damping force information) uob output from the estimated damping force calculation section 5 based on the damping force control value P and obtains the estimated damping force after the delay correction (estimated damping force information after the delay correction) ux. For example, a delay correction term is set with respect to the estimated nonlinear component (estimated damping force and estimated damping force information) uob corresponding to the damping force control value P.

Moreover, in the embodiment, the delay correction term is applied to only the nonlinear component of the estimated damping force, but the configuration is not limited to the embodiment, and the delay correction term may be applied to both the linear component and the nonlinear component. In addition, the delay correction term may be applied to only the linear component. Furthermore, fd(y, P) may be applied to the delay correction term without being divided into the linear component and the nonlinear component. In addition, the delay correction term may be not applied to the damping force, but may be applied to correlation information (damping force information) correlated with the damping force of the damper 20. Moreover, concepts of the damping force, the linear component of the damping force, the nonlinear component of the damping force, the correlation information correlated with the damping force, and the like are referred to as the "damping force information" and an estimated value of the "damping force information" is referred to as the "estimated damping force information".

In addition, in the embodiment, in a plurality of different damping coefficients of the damper 20, the delay correction term is varied so as to reduce divergence between the actual measured relative velocity y and the estimated relative velocity yob.

For the delay correction terms of the embodiment, it is preferable that the delay correction terms are varied in the plurality of the different damping coefficients including the damping coefficients at least in a full hard state and in a full soft state. In the embodiment, for example, the state of the damper 20 is divided into 30 from the full hard state to the full soft state and the damping coefficient of damping control is set with respect to each state.

The delay correction term is an n-order delay correction term.

As the n-order delay correction term, it is possible to use, for example, a primary delay correction term "K/(1+TS)" (here, T is a variable time constant and S is a Laplace operator), a second-order delay correction term "K$\omega$n$^2$/(S+

$2\zeta\omega n+\omega n^2)$" (here, S is the Laplace operator, $\zeta$ is a damping ratio, and $\omega n$ is a natural frequency), and the like.

In the plurality of the damping coefficients, if the primary delay correction term is applied, it is possible to vary the delay correction term in each damping coefficient by varying T (variable time constant) based on the damping force control value P.

In addition, it is possible to vary the delay correction term in each damping coefficient by applying the delay correction term of the number of time different in each damping coefficient. If the delay correction term of the different number of time is applied, the damping coefficient of the different number of time may not be applied in all the damping coefficients or the damping coefficient of the same number of time may be applied in a part of the plurality of the damping coefficients. For example, when the state of the damper 20 is divided into the full soft state, an intermediate state, and the full hard state, the full soft state and the intermediate state are the primary delay correction term "K/(1+TS)" (here, T is the variable time constant and S is the Laplace operator), and the full hard state may be the second-order delay correction term.

The delay correction section 6 changes the delay correction term based on the damping force control value P during calculation and outputs a value obtained by multiplying the delay correction term to the estimated nonlinear component (estimated damping force and estimated damping force information) uob as the estimated damping force after the delay correction (estimated damping force information after the delay correction) ux.

The relative velocity calculation section 7 derives the estimated relative velocity yob based on the estimated damping force after the delay correction (estimated damping force information after the delay correction) ux. The relative velocity calculation section 7 corresponds to Expression (6) and Expression (7) described above. Each column vector included in the relative velocity calculation section 7 corresponds to A, B, C, D, H, and U within Expression (6) and Expression (7). The column vectors are values that are set with reference to theoretical values and are adjusted so as to cause the estimated relative velocity yob to approach the actual measured value of the relative velocity y.

An operation of the relative velocity estimation device 3 by the delay correction section 6 will be described with reference to FIGS. 6A to 8.

Figure 6A:
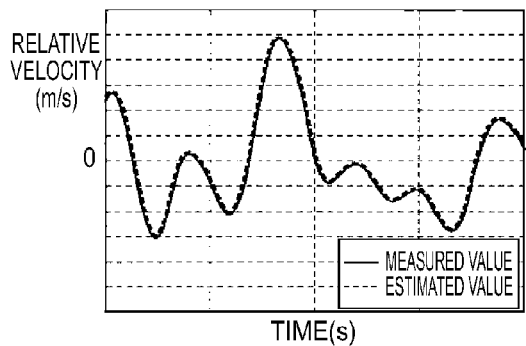
FIGS. 6A and 6B are graphs of a damping force control apparatus of a suspension of a first structure of the related art.
Figure 6B:
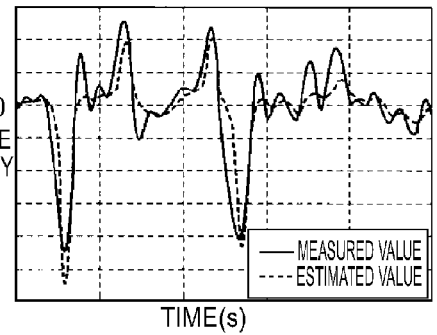

FIGS. 6A and 6B are graphs comparing the estimated relative velocity yob (estimated value) that is estimated by the damping force control apparatus (damping force control apparatus having no the delay correction section 6) of the related art such as JP10-913A and an actual measured value. FIG. 6A illustrates the estimated relative velocity yob (estimated value) and the actual measured value in the soft state and FIG. 6B illustrates the estimated relative velocity yob (estimated value) and the actual measured value in the hard state. A vertical axis indicates the relative velocity (m/s) and a horizontal axis indicates time (s).

In the example, when the damper 20 is in the soft state, each coefficient within the observer is set such that the divergence between the estimated relative velocity yob and the actual measured relative velocity y is minimized. Thus, when the damper 20 is in the soft state, the divergence between the estimated relative velocity yob (estimated value) and the actual measured relative velocity y is small. On the other hand, when the damper 20 is in the hard state, as illustrated in FIG. 6B, the divergence between the estimated relative velocity yob and the actual measured relative velocity y is large. That is, it is considered that delay of the estimation occurs in the estimation of the related art.

Next, another technique of the related art is illustrated.

Figure 7A:
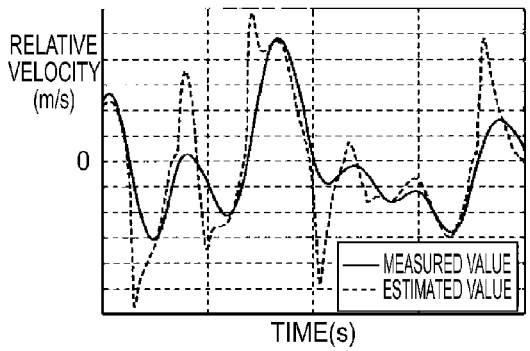
FIGS. 7A and 7B are graphs of a damping force control apparatus of a suspension of a second structure of the related art.
Figure 7B:
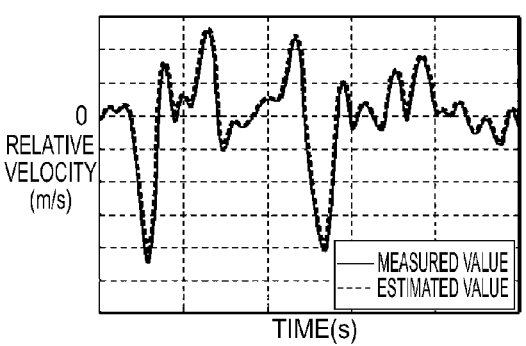

FIGS. 7A and 7B are graphs comparing the estimated relative velocity yob (estimated value) that is estimated by the damping force control apparatus (damping force control apparatus in which the delay correction term is constant) of the related art such as JP2010-58541A and an actual measured value. FIG. 7A illustrates the estimated relative velocity yob (estimated value) and the actual measured value in the soft state and FIG. 7B illustrates the estimated relative velocity yob (estimated value) and the actual measured value in the hard state.

If the delay correction is performed such that the divergence between the estimated relative velocity yob and the actual measured damping force calculation device is minimized during in the hard state, the divergence between the estimated relative velocity yob and the actual measured relative velocity y is large in the soft state.

Figure 8A:
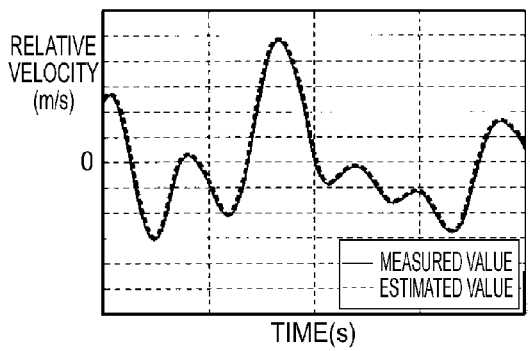
FIGS. 8A and 8B are graphs of a damping force control apparatus of a suspension of the embodiment.
Figure 8B:
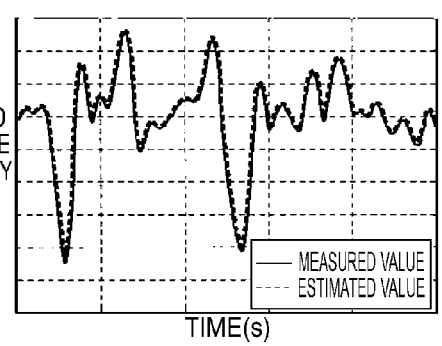

FIGS. 8A and 8B are graphs comparing the estimated relative velocity yob (estimated value) that is estimated by the damping force control apparatus 1 (damping force control apparatus having the delay correction section 6) of the embodiment and an actual measured value. FIG. 8A illustrates the estimated relative velocity yob (estimated value) and the actual measured value in the soft state and FIG. 8B illustrates the estimated relative velocity yob (estimated value) and the actual measured value in the hard state.

In the example, each coefficient within the observer is set such that the divergence between the estimated relative velocity yob and the actual measured relative velocity y is minimized when the damper 20 is in the soft state. Thus, when the damper 20 is in the soft state, the divergence between the estimated relative velocity yob (estimated value) and the actual measured relative velocity y is small. In addition, even when the damper 20 is in the hard state, as illustrated in FIG. 8B, the divergence between the estimated relative velocity yob (estimated value) and the actual measured relative velocity y is small. This is an effect by correcting the estimated nonlinear component (estimated damping force and estimated damping force information) uob based on the damping force control value P in the delay correction section 6.

In the present technique, the estimated nonlinear component (estimated damping force and estimated damping force information) uob of the damping force fd(y, P) is corrected based on a size of the damping force control value P. That is, in the correction of the estimated nonlinear component (estimated damping force and estimated damping force information) uob, a width of the divergence between the estimated relative velocity yob and the actual measured value is reduced by varying the delay correction term in a state of each damping coefficient from the soft state to the hard state of the damper 20 in the damping coefficients. Such an effect of reduction of the width of the divergence is obtained by a close relationship between the damping force control value P, and the width of the divergence between the estimated relative velocity yob (estimated value) and the actual measured relative velocity y. The width of the divergence is reduced over a wide range of the damping coefficients by feeding back the damping force control value P with respect to estimated calculation regarding the damping force (specifically, the estimated nonlinear component (estimated damping force and estimated damping force information) uob).

Next, effects of the damping force control apparatus 1 according to the embodiment will be described.

(1) In the embodiment, the estimated damping force calculation section 5 that forms the estimated nonlinear component (estimated damping force and estimated damping force information) uob, the delay correction section 6 that obtains the estimated damping force after the delay correction (estimated damping force information after the delay correction) ux by correcting the estimated nonlinear component (estimated damping force and estimated damping force information) uob, and the relative velocity calculation section 7 that calculates the estimated relative velocity yob based on the estimated damping force after the delay correction (estimated damping force information after the delay correction) ux and the vehicle acceleration (input variable of the relative velocity estimation device) Za are provided. The delay correction section 6 corrects the estimated nonlinear component (estimated damping force and estimated damping force information) uob based on the damping force control value P during calculation and varies the delay correction term such that the divergence between the actual measured relative velocity y and the estimated relative velocity yob is small in the plurality of the different damping coefficients of the damper 20.

As described above, there is a close relationship between the damping force control value P and the width of the divergence between the estimated relative velocity yob (estimated value) and the actual measured relative velocity y. Thus, it is possible to increase the estimation accuracy of the relative velocity y based on the damping force control value P. In addition, the delay correction term is varied such that the divergence between the actual measured relative velocity y and the estimated relative velocity yob is reduced in the plurality of the different damping coefficients of the damper 20. It is possible to improve the accuracy of the estimated relative velocity of the damper 20 over the wide range of the damping coefficients of the damper 20.

(2) In the above-described embodiment, the delay correction section 6 varies the delay correction term based on the damping force control value P during calculation and outputs the value that is obtained by multiplying the delay correction term to the estimated nonlinear component (estimated damping force and estimated damping force information) uob as the estimated damping force after the delay correction (estimated damping force information after the delay correction) ux. According to the configuration, it is possible to increase the estimation accuracy of the relative velocity y without complicated calculation.

(3) The suspension of the vehicle may be configured to include the damping force control apparatus 1 according to the embodiment.

According to the damping force control apparatus 1 described above, in order to improve the estimation accuracy of the relative velocity y, damping characteristics of the damper 20 of the suspension are improved. Specifically, the damping characteristics are improved over the wide range from the soft state to the hard state. Thus, ride comfort of the vehicle including the suspension is improved.

Technique according to the embodiment described above and other embodiments is applied to the suspension of the vehicle. Thus, since the damping characteristics of the damper 20 (semi-active damper) of the suspension is improved and the accuracy of the estimated relative velocity of the damper is improved over the wide range of the damping coefficients, ride comfort of the vehicle is improved.

(1) A damping force control apparatus according to an aspect of this disclosure controls a damping force control value for a damper in which a damping force is set by the damping force control value, and includes: a relative velocity estimation device that estimates a relative velocity of a vehicle wheel with respect to a vehicle body; and a damping force calculation device that determines the damping force control value so as to control vibration of the vehicle body based on control input variables of the vehicle body and an estimated relative velocity that is estimated by the relative velocity estimation device. The relative velocity estimation device includes an estimated damping force calculation section that estimates the damping force of the damper based on the estimated relative velocity and the damping force control value, a delay correction section that obtains an estimated damping force after delay correction by correcting the estimated damping force that is estimated by the estimated damping force calculation section, and a relative velocity calculation section that calculates the estimated relative velocity based on the estimated damping force after the delay correction and input variables of the relative velocity estimation device. The delay correction section corrects the estimated damping force based on the damping force control value during calculation and varies delay correction terms so as to reduce divergence between the actual measured relative velocity and the estimated relative velocity in a plurality of different damping coefficients of the damper.

According to this configuration, the delay correction section varies the delay correction terms so as to reduce the divergence between the actual measured relative velocity and the estimated relative velocity in the plurality of different damping coefficients of the damper. Thus, it is possible to improve accuracy of the estimated relative velocity of the damper over the wide range of the damping coefficients compared to the related art.

(2) In the damping force control apparatus of a suspension, the delay correction section may change the delay correction terms based on the damping force control value during calculation and output a value obtained by multiplying the delay correction terms to the estimated damping force as the estimated damping force after the delay correction. According to this configuration, it is possible to increase accuracy of the relative velocity without complicated calculation.

(3) A damping force control apparatus of a suspension according to another aspect of this disclosure controls a damping force control value for a damper in which a damping force is set by the damping force control value, and includes: a relative velocity estimation device that estimates a relative velocity of a vehicle wheel with respect to a vehicle body; and a damping force calculation device that determines the damping force control value so as to control vibration of the vehicle body based on control input variables of the vehicle body and an estimated relative velocity that is estimated by the relative velocity estimation device. The relative velocity estimation device includes an estimated damping force calculation section that estimates damping force information relating to the damping force of the damper based on the estimated relative velocity and the damping force control value, a delay correction section that obtains estimated damping force information after delay correction by correcting the estimated damping force information that is estimated by the estimated damping force calculation section, and a relative velocity calculation section that calculates the estimated relative velocity based on the estimated damping force information after the delay correction and input variables of the relative velocity estimation device. The delay correction section corrects the estimated damping force information based on the damping force control value during calculation and varies delay correction terms so as to reduce divergence between the actual measured relative velocity and the estimated relative velocity in a plurality of different damping coefficients of the damper.

(4) The delay correction section of the damping force control apparatus of a suspension may change the delay correction terms based on the damping force control value during calculation and output a value obtained by multiplying the delay correction terms to the estimated damping force information as the estimated damping force information after the delay correction. According to the configuration, it is possible to increase accuracy of the estimated relative velocity without complicated calculation.

(5) A suspension according to still another aspect of this disclosure includes the damping force control apparatus. According to this configuration, damping characteristics of the suspension are improved by the improvement of estimation accuracy of the relative velocity.

The damping force control apparatus of the suspension can improve accuracy of the estimated relative velocity of the damper over the damping coefficients of the wide range.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damping force control apparatus comprising:
at least one processor configured to:
estimate a relative velocity of a vehicle wheel with respect to a vehicle body;
determine a damping force control value so as to control vibration of the vehicle body based on control input variables of the vehicle body and the estimated relative velocity; and
control a damper in which a damping force is set based upon the damping force control value,
wherein, to estimate the relative velocity, the at least one processor is configured to:
estimate the damping force of the damper based on the estimated relative velocity and the damping force control value,
obtain an estimated damping force after delay correction by correcting the estimated damping force, and
calculate the estimated relative velocity based on the estimated damping force after the delay correction and input variables of the relative velocity estimation, and
wherein, to correct the estimated damping force, the at least one processor is configured to:
correct the estimated damping force based on the damping force control value during calculation, and
vary delay correction terms so as to reduce divergence between the actual measured relative velocity and the estimated relative velocity in a plurality of different damping coefficients of the damper.

2. The damping force control apparatus according to claim 1, wherein, to correct the estimated damping force, the at least one processor is configured to:
change the delay correction terms based on the damping force control value during calculation, and
output a value obtained by multiplying the delay correction terms to the estimated damping force as the estimated damping force after the delay correction.

3. The damping force control apparatus according to claim 2, wherein the damping force control apparatus is a part of a suspension of the vehicle body.

4. The damping force control apparatus according to claim 1, wherein the damping force control apparatus is a part of a suspension of the vehicle body.

5. A damping force control apparatus comprising:
at least one processor configured to:
estimate a relative velocity of a vehicle wheel with respect to a vehicle body;
determine a damping force control value so as to control vibration of the vehicle body based on control input variables of the vehicle body and the estimated relative velocity; and
control a damper in which a damping force is set based upon the damping force control value,
wherein, to estimate the relative velocity, the at least one processor is configured to:
estimate damping force information relating to the damping force of the damper based on the estimated relative velocity and the damping force control value,
obtain estimated damping force information after delay correction by correcting the estimated damping force information, and
calculate the estimated relative velocity based on the estimated damping force information after the delay correction and input variables of the relative velocity estimation, and
wherein, to correct the estimated damping force information, the at least one processor is configured to:
correct the estimated damping force information based on the damping force control value during calculation, and
vary delay correction terms so as to reduce divergence between an actual measured relative velocity and the estimated relative velocity in a plurality of different damping coefficients of the damper.

6. The damping force control apparatus according to claim 5, wherein, to correct the estimated damping force information, the at least one processor is configured to:
change the delay correction terms based on the damping force control value during calculation, and
output a value obtained by multiplying the delay correction terms to the estimated damping force information as the estimated damping force information after the delay correction.

7. The damping force control apparatus according to claim 6, wherein the damping force control apparatus is a part of a suspension of the vehicle body.

8. The damping force control apparatus according to claim 5, wherein the damping force control apparatus is a part of a suspension of the vehicle body.

* * * * *